Figure 9:
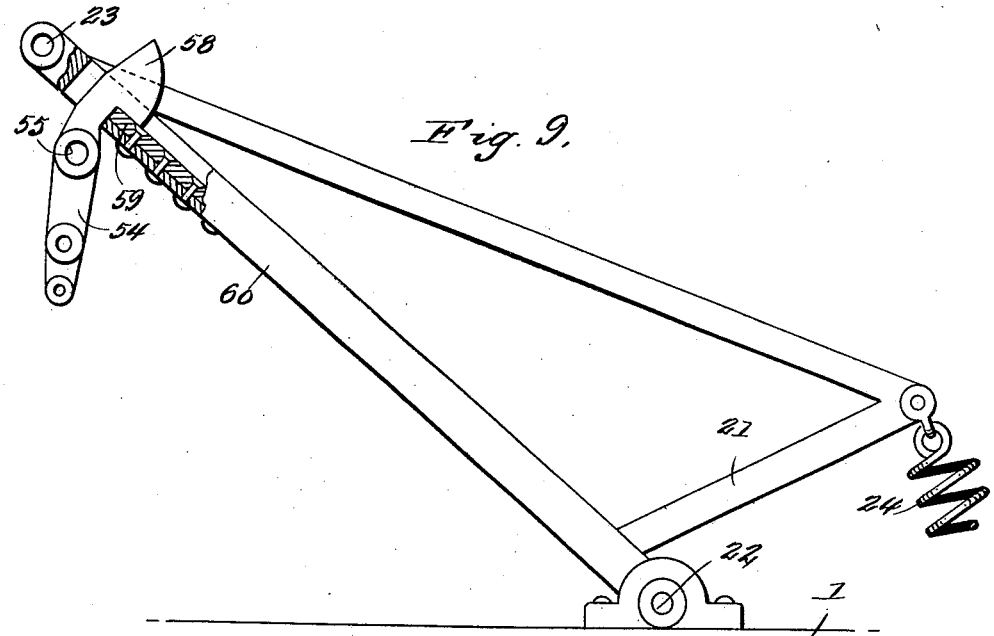

L. A. SPRAGUE.
MEANS FOR LAUNCHING LIFE BOATS.
APPLICATION FILED AUG. 8, 1913.
1,101,475.
Patented June 23, 1914.
7 SHEETS—SHEET 1.
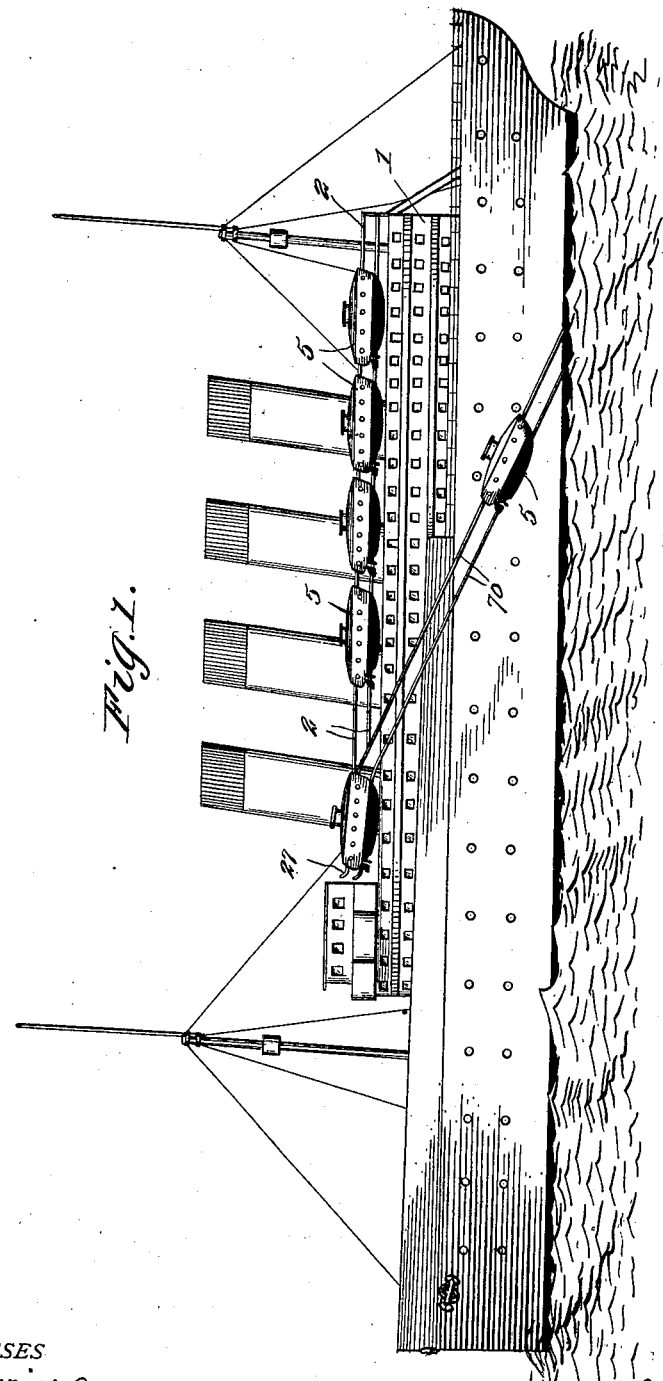

L. A. SPRAGUE.
MEANS FOR LAUNCHING LIFE BOATS.
APPLICATION FILED AUG. 8, 1913.
1,101,475.
Patented June 23, 1914.
7 SHEETS—SHEET 2.
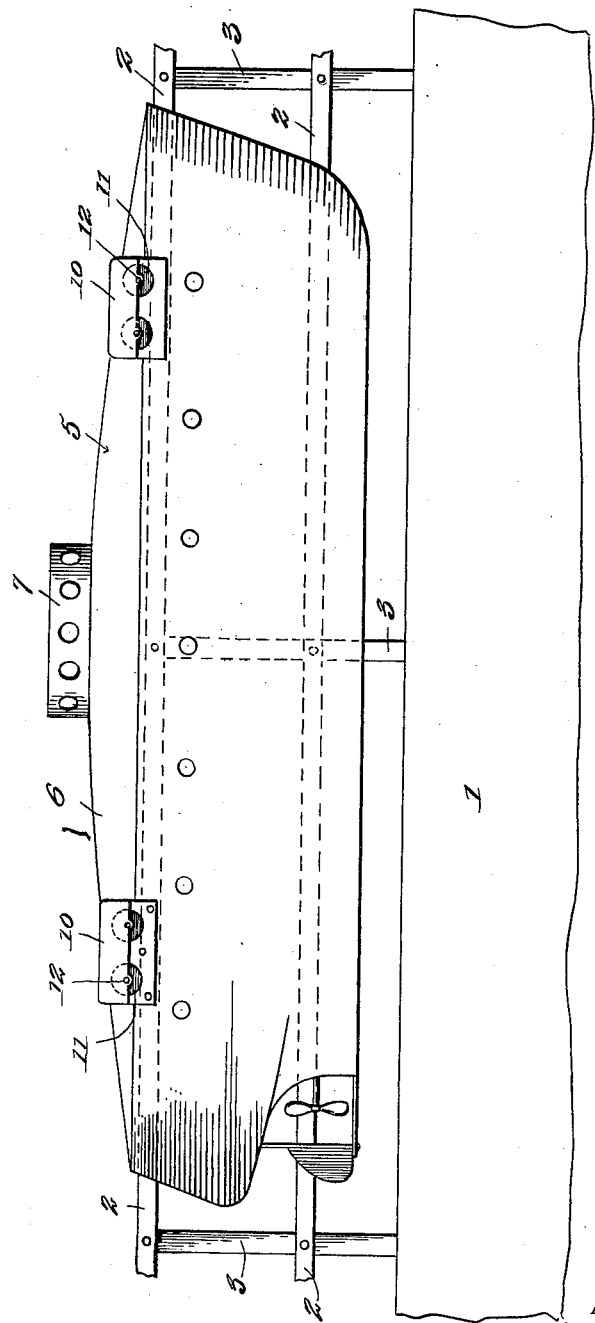
WITNESSES
G. M. Spring.
Wm. Ebalt Jr.
INVENTOR
Leo A. Sprague,
Richard ____ Attorney L. A. SPRAGUE.
MEANS FOR LAUNCHING LIFE BOATS.
APPLICATION FILED AUG. 8, 1913.
1,101,475.
Patented June 23, 1914.
7 SHEETS—SHEET 3.
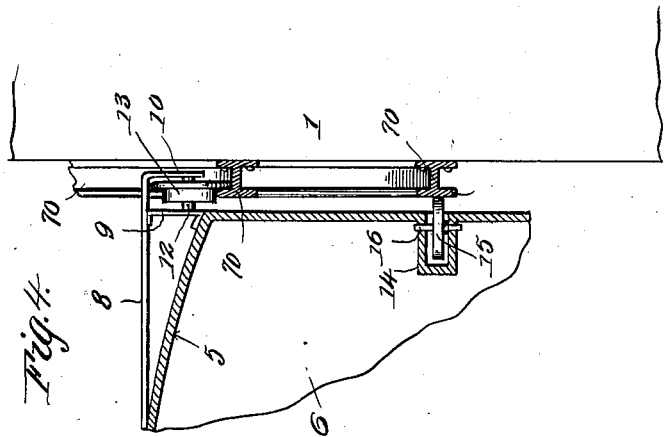
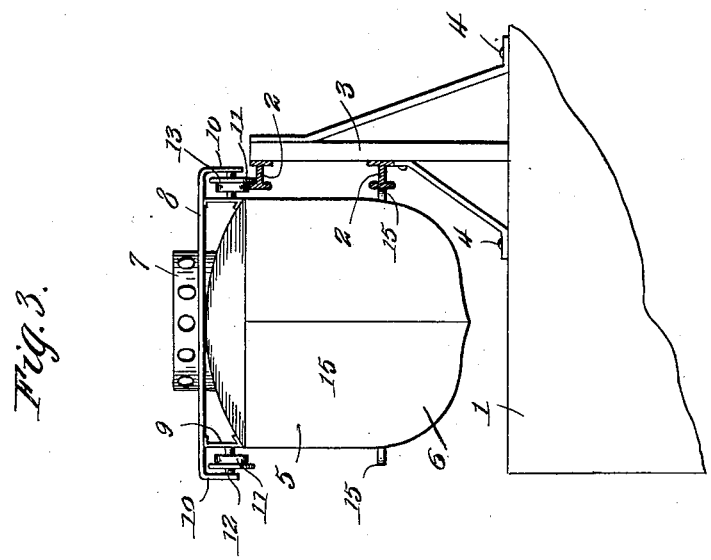
WITNESSES
G. M. Spring
W. E. Valk Jr.
INVENTOR
Leo A. Sprague,
Richard Eiver Attorney

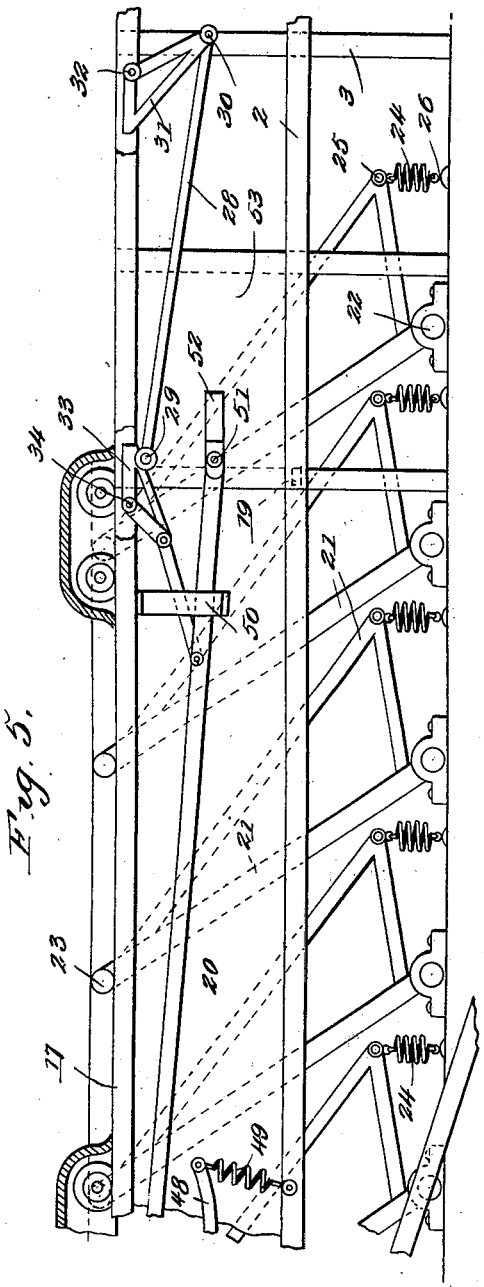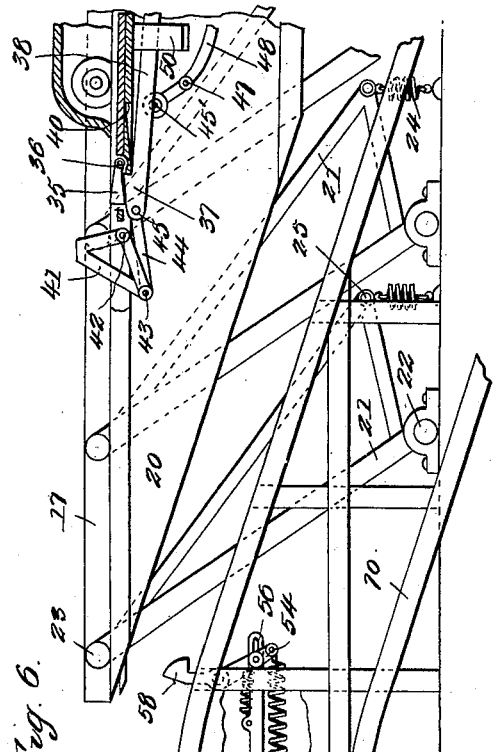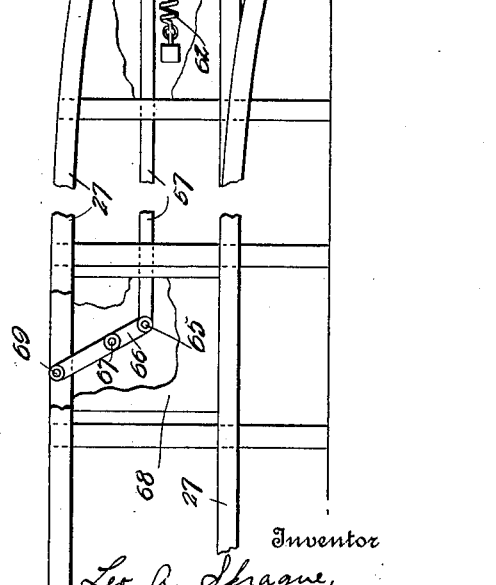

L. A. SPRAGUE.
MEANS FOR LAUNCHING LIFE BOATS.
APPLICATION FILED AUG. 8, 1913.
1,101,475.
Patented June 23, 1914.
7 SHEETS—SHEET 5.
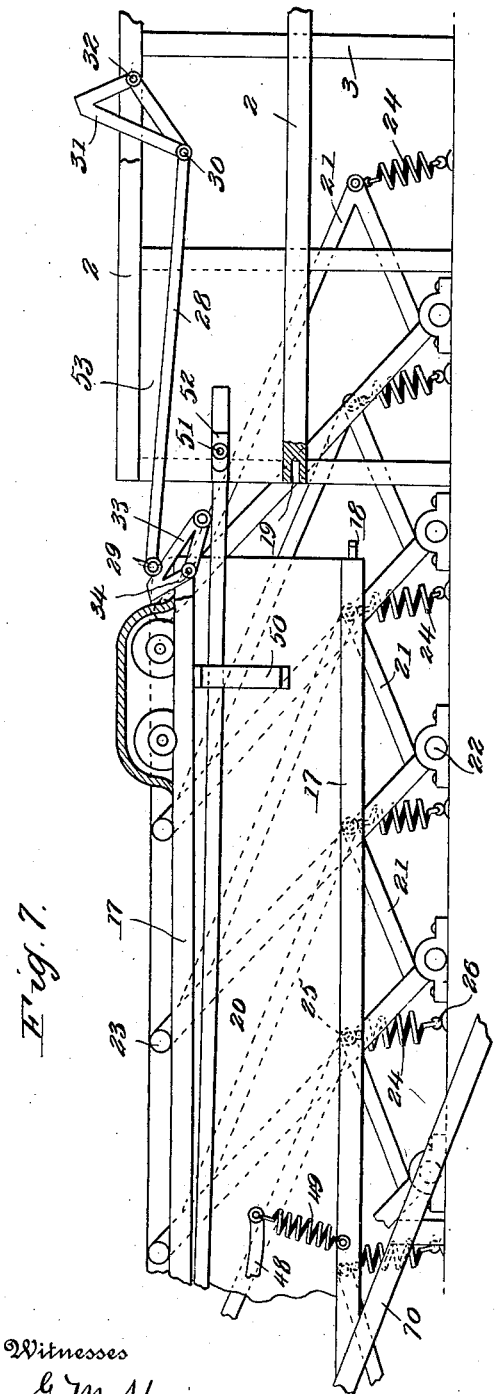
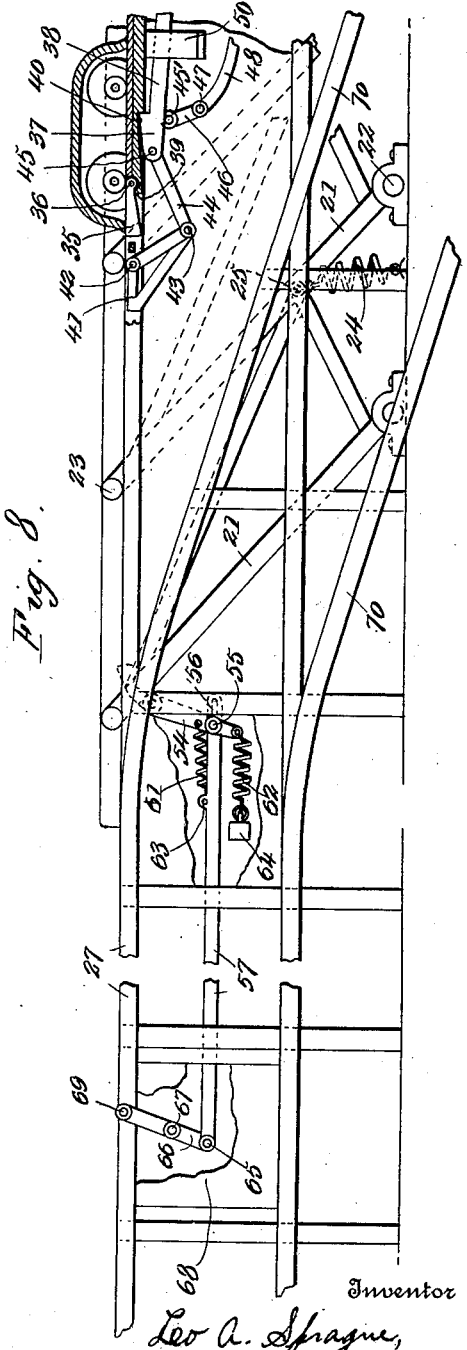
Witnesses
G. M. Spring
W. E. Valk
Inventor
Leo A. Sprague,
By Richard Eyre,
his Attorney

L. A. SPRAGUE.
MEANS FOR LAUNCHING LIFE BOATS.
APPLICATION FILED AUG. 8, 1913.

1,101,475.

Patented June 23, 1914.
7 SHEETS—SHEET 6.

L. A. SPRAGUE.
MEANS FOR LAUNCHING LIFE BOATS.
APPLICATION FILED AUG. 8, 1913.
1,101,475.
Patented June 23, 1914.
7 SHEETS—SHEET 7.
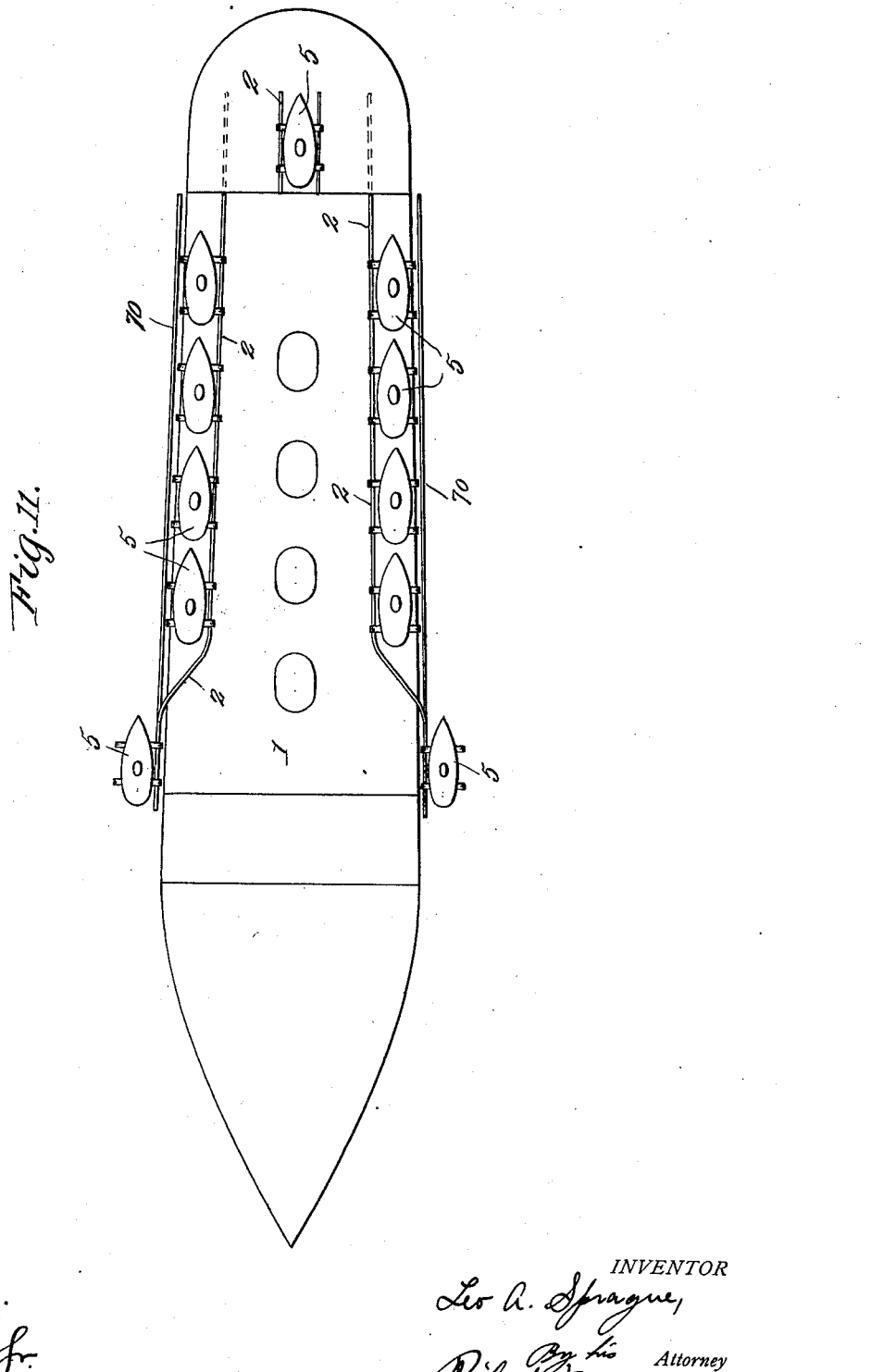
WITNESSES
INVENTOR
Attorney

UNITED STATES PATENT OFFICE.

LEO A. SPRAGUE, OF HENDERSON, NEW YORK.

MEANS FOR LAUNCHING LIFE-BOATS.

1,101,475.   Specification of Letters Patent.   Patented June 23, 1914.

Application filed August 8, 1913.  Serial No. 783,836.

*To all whom it may concern:*

Be it known that I, LEO A. SPRAGUE, a citizen of the United States, residing at Henderson, in the county of Jefferson and State of New York, have invented certain new and useful Improvements in Means for Launching Life-Boats, of which the following is a specification.

This invention relates to improved means for the launching of life boats from the deck of ocean steamers or other vessels.

The primary object of the invention contemplates the provision of simple and efficient means whereby any number of life boats may be quickly and systematically launched from the deck of a vessel without slackening the speed of the vessel or in any way endangering the lives of those within the boats, such means being so arranged upon the sides of the vessel as to lower the boats, one at a time, upon an angle directly into the water, thereby giving sufficient impetus to the lowered boat to carry the same away from the moving vessel and well on its course of travel.

A further object of the invention resides in the provision of suitable supporting means in the form of a trackway arranged conveniently upon the deck of the vessel, the life boats supported thereby adapted to be automatically released and floated should the vessel sink and the water rise sufficiently to float the said boats.

A still further object of the invention is to provide automatically operated switch mechanism for swinging or side-tracking the life boats from the main supporting track-ways to the angular or inclined track-ways, each boat being swung from the former to the latter where it is free to descend or be lowered directly into the water.

A further object of the invention is to provide specially devised life boats so constructed as to be rolled or swung from place to place upon the deck of the vessel, and quickly and conveniently launched or lowered to the water should occasion demand, the boats being loaded previous to the lowering operation, and so constructed as to prevent swamping thereof when lowered into the water.

The above and additional objects are accomplished by such means as are illustrated in their preferred embodiment in the accompanying drawings, described in the following specification and then more particularly pointed out in the claims which are appended hereto and form a part of this application.

In describing my invention in detail, reference will be had to the accompanying drawings wherein like characters denote like or corresponding parts throughout the several views, and in which:—

Figure 10:
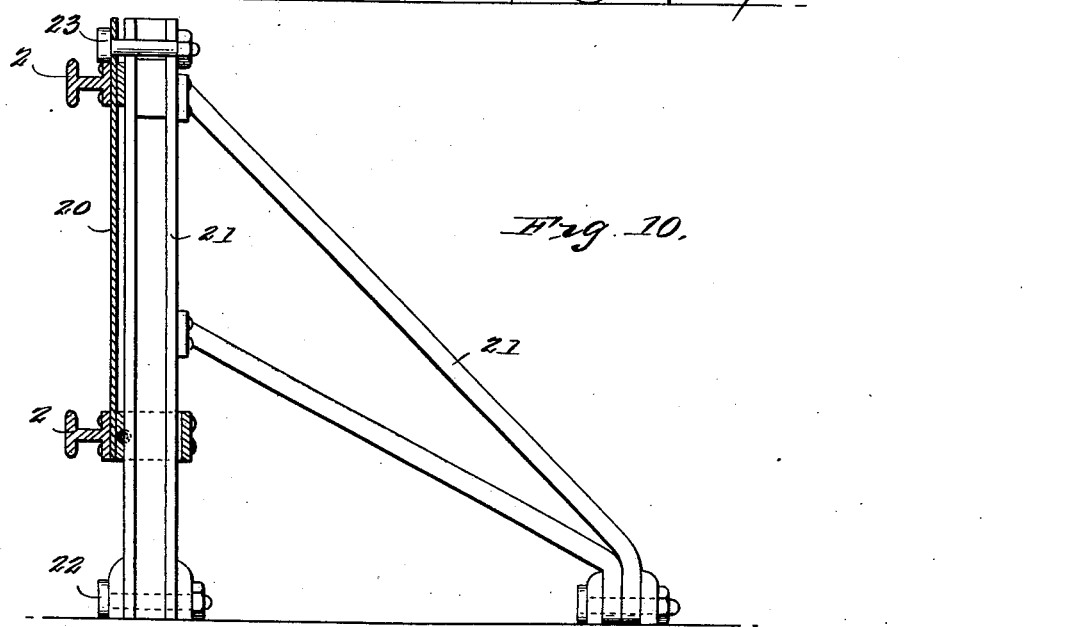

Figure 1 is a side elevation of a vessel illustrating the application of the invention; Fig. 2 is an enlarged side elevation of one of the life boats; Fig. 3 is a front elevation of one of the life boats, the rail or support therefor being shown in section; Fig. 4 is an enlarged fragmentary sectional view illustrating the manner in which the life boats are supported; Fig. 5 is a side elevation of a portion of the switch mechanism, the switch being open; Fig. 6, is a similar view of that portion of the switch mechanism not shown in Fig. 5; Fig. 7 is a view similar to Fig. 5, the switch being closed; Fig. 8 is a view similar to Fig. 6 showing the position of the parts when the switch is closed; Fig. 9 is an enlarged side elevation, parts being shown in section of one of the triangular switch rail supports; and, Fig. 10 is an enlarged vertical sectional view illustrating the manner in which the rails are supported. Fig. 11 is a top plan view illustrating the arrangement of the life boats upon the deck of a vessel.

Referring now to the drawings wherein is illustrated the preferred form of my invention, the numeral 1 designates the deck of the vessel upon which the supporting structure or main track-ways 2 are mounted. The track-ways 2 extend preferably throughout the entire length of the deck upon which they are supported, one trackway upon each side of the vessel, the said tracks being secured to suitable standards 3 secured as at 4 upon the deck, the detail construction of this particular feature being shown to advantage in Fig. 3 of the drawings.

The life boats, designated in their entirety by the numeral 5 may be constructed in size and shape to suit the demand made thereupon, the said boats comprising a body portion 6 having an annular projection 7 formed upon the top thereof, the said projection being open at its upper extremity to facilitate the loading and unloading of the boat. Brackets 8 are supported upon the top of each boat, one near each end thereof, by means of smaller brackets 9 secured to the body of the boat, the end of the bracket 8 having extensions 10 formed integrally therewith and depending parallel with the smaller brackets 9 above mentioned. Wheels 11 are loosely mounted upon suitable spindles 12 between the said depending portions 10 and the brackets 9, the wheels upon one side of the boat adapted to engage the upper edge of the upper rail forming a part of the main track-way 2. An annular flange 13 is formed upon the periphery of the wheels to prevent derailment of the latter and to retain the same in proper place upon the track. Recesses 14 are formed within the sides of the body portion 6 of the boat, the said recesses adapted to house or contain a wheel 15 rotatably mounted upon a spindle 16 journaled within the walls of the said recess, the periphery of the wheel extending beyond the edge of the life boat so as to engage the outer face of the lower rail of the track-way 2.

The engagement between the wheels 15 and the lower rail of the track-way 2 will at all times support the life boat in the desired manner, the said boat being free to roll or move forwardly or rearwardly upon the track-way 2 as occasion demands. By pushing or otherwise forcing the life boat along the track-way 2, the same is swung on to the switch operating mechanism to be hereinafter fully described, the weight of the boat when upon the switch adapted to automatically close the latter in a manner to be hereinafter fully described.

Passing on to the switch operating mechanism, illustrated in Figs. 5 to 10 inclusive, the said mechanism comprises a pair of uniformly spaced apart parallel switch rails 17 the lower of which is provided with a projection 18 formed upon the extremity thereof, which is adapted to fit within a recess 19 formed within the meeting extremity of the lower rails of the track-way 2, this engagement between the said projection and the recess normally supporting the switch rails in alinement therewith. The said rails 17 are supported upon a plate member 20 which extends throughout the entire length of the rails 17, the said member being in turn supported by a plurality of triangular-shaped supporting members 21 pivotally secured as at 22 upon the deck of the vessel 1, the opposite end of the said supporting members 21 from that of the pivot point 22 being pivotally secured as at 23 to the plate member 20. Spring members 24 are secured as at 25 to the triangular supports 21, the opposite end of the said spring members being secured as at 26 to the deck of the vessel, this arrangement of the springs with respect to the said supports permitting the latter to be moved forwardly upon their pivot point 22 when one of the life boats 5 is rolled or forced on to the switch rails 17. As the said lifeboat is moved on to the rails 17, the projection 18 is withdrawn from the recess 19 and the rails 17 swung forwardly with the supports 21 until the forward inclined face of the said rails engages a similar inclined face of the rails 27 on to which the life boat in question is run. Suitable mechanism has been provided for guiding and directing the movement of the switch rails 17, said mechanism including a lever 28 having one end pivotally secured as at 29 to the plate member 20 and the opposite end pivotally secured as at 30 to a triangular-shaped lever 31 in turn pivotally secured as at 32 to the upper rail of the main track-way 2. The wheels 11 of the life boat pass on to the switch rails 17, the said rails being moved forwardly, this being caused by the weight of the boat, forcing a portion of the triangular lever 31 above the upper of the main track-way rails 2, this arrangement preventing backward movement of the boat 5 thereupon. A second triangular-shaped lever 33 is pivotally secured as at 34 to the upper of the switch rails 17, the said lever 33 being actuated according to the movement of the lever 28 to form a stop for the life boat 5 after the boat has passed entirely on to the switch rails 17.

As the wheels of the life boat move forwardly upon the switch rails 17, the front wheels are forced into engagement with a trigger 35 which is pivotally secured as at 36 to the upper switch rail 17. The engagement between the wheels 11 and the trigger 35 causing the hook shaped head 37 of a lever 38 to be withdrawn from engagement with a notch or shoulder 39 formed within the said rail and, as the switch rails move forwardly, the said head 37 is forced into engagement with a notch 40 formed in spaced relation to the shoulder 39 above mentioned, this engagement limiting the forward movement of the rails 17 and supporting the said rails in alinement with the rails 27 above mentioned. The movement of the said lever 38 also actuates a third triangular-shaped lever 41 pivotally secured as at 42 to the upper rails 17 of the switch rails, the said triangular lever being pivotally secured to a link 44 in turn pivotally secured to a head 45. The forward movement of the rails 17 causes the triangular-shaped lever, which normally extends in the path of the wheels 11 of the life boat, to be forced beneath the rails 17 as illustrated in Fig. 8 of the drawings, permitting the said wheels to pass freely along the rails 17 and on to the rails 27 of that part of the track-way on to which the life boat 5 is switched. To act as a guide and support for the lever 38, a roller 45′ is provided which is placed to engage the under face of the said lever, the roller being supported by means of a lever 48 pivoted as at 47 to the plate member 20, the opposite end of said lever being secured to the lower rail 17 through the medium of a spring member 49 provided for the purpose of forcing the roller 45' into engagement with the said lever. Brackets 50 are provided, one near each end of the lever 38 to act as guides therefor, the rear or opposite end of the said lever from that upon which the head 37 is formed being pivotally secured as at 51 to a bracket 52 which is in turn supported upon a plate 53 secured at the extremity of the main track-way 2.

By moving the life boat 5 forwardly upon the switch rails 17, until the said boat is entirely removed from engagement therewith, and is supported upon the rails 27 above mentioned, the springs 24 will automatically return the switch rails 17 and the support means therefor to their normal position causing the levers to assume the positions illustrated in Figs. 5 and 6 of the drawings, and the projection 18 to again fit within the recess 19 thereby alining the rails 17 with the rails 2 ready for the next boat as it is moved forwardly upon the track-way 2.

Means is provided for automatically locking the switch rails 17 into engagement with the rails 27 (onto which the life boat acted upon is slid during the forward and downward movement of the switch mechanism), the said means comprising a lever 54 pivoted as at 55, the pivot point working within a slot 56 formed within a horizontally extending lever 57 disposed midway between the rails 27. The said lever 54 is provided with a head 58 which is adapted to automatically engage or overlap a block 59 secured to the forward end of a triangular-shaped supporting member 60, this engagement between the head 58 and the said block causing the said member 60 to be locked or fastened in an inclined position thereby causing the inclined extremities of the rails 17 to lie flush upon the inclined surface of the upper of the rails 27. By locking the support member 60, the entire switch mechanism is automatically locked, the said mechanism remaining in this condition until the wheels of the life boat 5 are entirely removed from the rails 17. As the boat 5 is swung or forced on to the rails 27, the head 58 of the lever 54 is withdrawn from engagement with the block 59 through the medium of the springs 61 and 62 respectively, secured to the lever 54 above and below the pivot point 55 thereof, the spring 61 being secured to the lever 57 as at 63 and the spring 62 being secured to a suitable stationary block 64 arranged adjacent the said lever 57. The rear end of the lever 57 is pivotally secured as at 55 to a lever 66 fulcrumed as at 67 to a plate 68 carried by the rails 27, the opposite end of the levers 66 having a roller 69 arranged thereupon, the said roller being disposed in the path of the wheels 11 of the life boat, the engagement between the said wheels and the said roller causing the lever 57 to be actuated and the head 58 to be withdrawn from engagement with the block 69 of the switch mechanism.

In actual practice, operation is as follows: The life boat having been forced on to the switch mechanism 17, will, by its weight, automatically move the switch mechanism forwardly and downwardly until the inclined faces of the rail 17 engage the similarly inclined surfaces of the rail 27, in which position, the tension of the springs 61 and 62 is sufficient to automatically lock the said mechanism, by the actuation of the lever 54, in the position illustrated in Fig. 8 of the drawings. Continued movement of the life boat upon the rail 27 will force the wheels of the boat into engagement with the roller 69, moving the levers 66 and 67 into the position illustrated in Fig. 6 and releasing the head 58 from engagement with the block 59, thus allowing the springs 24 to automatically return the switch mechanism to its normal position, out of engagement with the said rail 27. The disengagement of the life boat wheels with the rollers 69 will allow the springs 61 and 62 to automatically return the lever 54 to its normal position, ready to engage the block 59 during the launching of the next succeeding life boat. The above operation is executed during the launching operation of each boat.

Immediately upon releasing the switch mechanism the springs 24 return the said mechanism to its normal position as above mentioned permitting the boat which is then upon the rails 27 to be rolled forwardly thereupon and down to the and into the water upon the inclined rails 70 provided therefor at the side of the vessel upon which the launching apparatus is arranged.

It will be seen from the above, taken in connection with the accompanying drawings, that the life boats may be lowered, one at a time systematically and without confusion, thus eliminating to a great extent the danger and annoyance generally attending the launching of a life boat from a vessel in distress; that the boats may be launched regardless of the condition of the ship, as the said life boats are supported upon the track-ways provided therefor in such a novel and peculiar manner as to cause the boats to be floated immediately upon coming in contact with the water; and that the track-way at the side of the vessel being inclined toward the rear end thereof will start the life boats when launched in a direction opposite to the travel of the vessel.

If desired, the life boats may be made water-tight so that the launching of boats during a storm may be readily effected without danger to the occupants, this provision also permitting boats after being drawn under the water by the vortex caused by a sinking vessel to return to the surface when released by conflicting currents of the water.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent is:

1. Means for launching life boats from vessels including a main track way, an inclined track-way, and switch mechanism, the said mechanism adapted to be automatically operated to transfer the life boats acted upon from the said main track-way to the inclined track-way by the weight of the said life-boat supported thereby.

2. Means for launching life boats from vessels including a main track-way, an inclined track-way, switch mechanism normally supported upon the same plane as the said main track-way, the weight of the life boat acted upon, when supported by the said switch mechanism, adapted to automatically move the said mechanism into engagement with the said inclined track-way, as and for the purpose set forth.

3. Means for launching life boats from vessels including a main track-way, an inclined track-way, switch mechanism, the said mechanism adapted to be automatically actuated by the weight of the life boats supported thereby, and means forming a part of the switch mechanism adapted to automatically actuate the same, after the movement of the life boat acted upon therefrom, on to the said inclined track-way, as and for the purpose set forth.

4. Means for launching life boats from vessels including a main track-way, an inclined track-way, switch mechanism adapted to be normally supported upon the same plane as the said main track-way, the movement of the life boat acted upon adapted to automatically force the said mechanism out of alinement with the said main track-way and into engagement with the said inclined track-way, and means forming a part of the said switch mechanism adapted to automatically return the said mechanism into alinement with the said main track-way after a transfer of the life boat acted upon from the said mechanism to the said inclined track-way.

5. Means for launching life boats including a main track-way, an inclined track-way, automatically operated switch mechanism normally supported in alinement with the said main track-way, means operable by the movement of the life boat acted upon adapted to automatically disengage the said switch mechanism from the said main track-way, the weight of the said life boat adapted to force the said mechanism into engagement with the said inclined track-way, and means operable by the movement of the life boats upon the said inclined track-way adapted to release the said mechanism from engagement with the said inclined track-way, as and for the purpose set forth.

6. In means for launching life boats from vessels, the combination of a main track way, an inclined track way leading from the said main track way to the water line of the vessel, spring controlled automatically operated switch mechanism adapted to be forced into and out of engagement with the said inclined track way and means including a plurality of links and levers for controlling the movement of the said switch mechanism, as and for the purpose set forth.

7. In means for launching life boats from vessels, the combination of a main track way, an inclined track way leading from the main track way to the water line of the vessel, switch mechanism including a pair of parallel rails adapted to be normally supported upon the same plane as the rails of the main track way, a plurality of spring controlled support members mounted upon the deck of the vessel and pivotally connected to the said switch rails for swinging the latter into and out of engagement with the said inclined track way, and a plurality of links and levers adapted to be automatically operated by the movement of a life boat upon the said switch rails for controlling the movement of the switch mechanism, as and for the purpose set forth.

8. In means for launching life boats from vessels, the combination of a main track way, an inclined track way leading from the said main track way to the water line of the vessel, switch mechanism adapted to be normally supported upon the same plane as the said main track way, spring controlled support members adapted to normally support the said switch mechanism out of engagement with the said inclined track way, the said switch mechanism adapted to be forced into engagement with said inclined track way by the movement of the life boats thereupon, and means carried by the said inclined track way for automatically locking the switch mechanism in engagement therewith, as and for the purpose set forth.

9. In means for launching life boats from vessels, the combination of a main track way, an inclined track way leading from the main track way to the water line of the vessel, switch mechanism including a pair of parallel rails adapted to be normally supported in alinement with the said main track way, a plurality of spring controlled support members pivotally connected to the said switch rails for normally supporting the switch mechanism alined with the said main track way, means for locking the said switch rails alined with the said main track way, and means including a plurality of links and levers adapted to be automatically operated by the movement of a life boat upon the said switch rails for throwing the said switch rails into engagement with the said inclined track way, as and for the purpose set forth.

10. In means for launching life boats from vessels, the combination of a main track way comprising a pair of parallel rails, an inclined trackway leading from the said main trackway to the water line of the vessel, switch mechanism including a pair of parallel rails adapted to be normally locked in alinement with the said rails of the main trackway, a plurality of duplicate support members pivotally mounted upon the said vessel for normally supporting the said switch rails alined with the said main trackway, one end of the said support members being pivotally secured to the said switch rails, and means including a plurality of links and levers carried by the said switch mechanism and the said main track way and adapted to be automatically operated by the movement of a life boat thereupon for automatically throwing the switch rails out of alinement with the said main track way and into engagement with the said inclined track way, as and for the purpose set forth.

11. In means for launching life boats from vessels, the combination of a main track way, an inclined track way leading from the said main track way to the water line of the vessel, spring controlled switch mechanism adapted to be normally supported in alinement with the said main track way, means for locking the said switch mechanism in alined position, the movement of a life boat upon the said switch mechanism adapted to automatically release the same and throw the said switch into engagement with the said inclined track way, means including a spring controlled fastening member adapted to automatically lock the said switch mechanism into engagement with the said inclined track way, as and for the purpose set forth.

12. In means for launching life boats from vessels, the combination of a main track way, an inclined track way leading from the said main track way to the water line of the vessel, switch mechanism adapted to be normally supported in alinement with the said main track way, spring control means for supporting the said switch rails and means including a plurality of links and levers adapted to be automatically operated by the movement of a life boat upon the said switch rails, for throwing the latter out of alinement with the said main track way and into engagement with the said main track way, of a spring controlled lever pivotally connected to the said inclined track way, fastening means adapted to be operated according to the movement of the said lever, the said means adapted to engage the switch mechanism for locking the latter into engagement with the inclined track way, as and for the purpose set forth.

13. In means for launching life boats from vessels, the combination of a main track way, an inclined track way leading from the said main track way to the water line of the vessel, a plurality of pivotally mounted spring controlled support members arranged upon the said vessel, a plate member pivotally secured to the said support members, switch rails carried by the said plate member adapted to be normally supported by the said support members in alinement with the said main track way, and means including a plurality of links and levers adapted to be automatically operated by the movement of a life boat upon the said two track ways, for locking and unlocking the switch rails when in alined position, as and for the purpose set forth.

14. In means for launching life boats from vessels, the combination of a main trackway, an inclined track way leading from the said main track way to the water line of the vessel, switch rails adapted to be normally supported in alinement with the said main track way, trip mechanism carried by the said main track way adapted to be operated by the movement of a life boat thereupon for unlocking the switch rails from engagement with the said main track way, trip mechanism carried by the said switch rails adapted to throw the said switch rails into engagement with the said inclined track way, and means carried by the said inclined track way for locking the switch rails into engagement therewith, as and for the purpose set forth.

15. In means for launching life boats from vessels, the combination of a main track way, an inclined track way leading from the main track way to the water line of the vessel, switch rails adapted to be normally supported in alinement with the said main track way, trip mechanism carried by the said main track way adapted to be automatically operated by the movement of the life boat thereupon to permit the latter to move on to the said switch rails, trip mechanism carried by the said switch rails adapted to be automatically operated by the movement of the boat thereupon for throwing the said switch rails out of alinement with the said main track way and into engagement with the said inclined track way, means for locking the said switch rails into engagement with the said inclined track way, and means carried by the said inclined track way adapted to be operated by the movement of the life boat thereupon for automatically releasing the said switch rails from engagement therewith, as and for the purpose set forth.

16. In means for launching life boats from vessls, the combination of a main track-way, an inclined track-way, automatically operated switch mechanism adapted to be forced into and out of engagement with the said inclined track-way, and means for controlling the movement of the said switch mechanism.

17. In means for launching life boats from vessels, the combination of a main track-way, an inclined track-way, switch mechanism, means for locking the said switch mechanism out of engagement with the said main track-way and within engagement with the said inclined track-way, and means operable by the movement of the said life boat upon the said inclined track-way adapted to automatically release the said switch mechanism from engagement with the said inclined track-way, as and for the purpose set forth.

18. In means for launching life boats from vessels, the combination of a main track-way, an inclined track-way, switch mechanism, means for locking the said switch mechanism in engagement with the said main track-way, means operable by the movement of the said life boat upon the said switch mechanism to automatically release the said mechanism from engagement with the said main track-way, means for automatically locking the said switch mechanism in engagement with the said inclined track-way and means operable by the movement of the said life boat upon the said inclined track-way to automatically release the said switch mechanism from engagement therewith, as and for the purpose set forth.

19. In means for launching life boats from vessels, the combination of a main track-way, an inclined track-way, switch mechanism, means carried by the said main track-way adapted to be operated by the movement of the life-boat thereupon to release the said mechanism from engagement therewith, means for automatically locking the said switch mechanism in engagement with the said inclined track-way, and means operable by the movement of the life-boat upon the said inclined track-way adapted to automatically release the said mechanism from engagement therewith, as and for the purpose set forth.

20. In means for launching life boats from vessels, the combination of a main track-way, an inclined track-way, switch rails, means for normally supporting said rails in alinement with the said main track-way, means operable by the movement of the life boat acted upon to release the said switch rails from engagement with the said main track-way and move the said rails into engagement with the said inclined track-way, means for automatically locking the said switch rails in engagement with the said inclined track-way, and means operable by the movement of the life boat upon the said inclined track-way adapted to automatically release the said switch rails from engagement therewith, as and for the purpose set forth.

In testimony whereof I affix my signature in presence of two witnesses.

LEO A. SPRAGUE.

Witnesses:
J. C. AYERS,
A. M. LEFFINGWELL.

Copies of this patent may be obtained for five cents each, by addressing the "Commissioner of Patents, Washington, D. C."